United States Patent [19]
Bosc et al.

[11] Patent Number: 5,221,576
[45] Date of Patent: Jun. 22, 1993

[54] ALUMINUM-BASED COMPOSITE AND CONTAINERS PRODUCED THEREFROM

[75] Inventors: Richard Bosc, Voreppe; Pierre Brugerolle; Alain Jupin, both of Sainte-Ménéhould; René Layre, Grenoble, all of France

[73] Assignee: Cebal, Clichy, France

[21] Appl. No.: 547,200

[22] Filed: Jul. 3, 1990

[30] Foreign Application Priority Data

Jul. 6, 1989 [FR] France ................... 89 09453

[51] Int. Cl.⁵ .............................. B32B 5/16
[52] U.S. Cl. ........................... 428/327; 428/35.8; 428/35.9; 428/36.6; 428/36.7; 428/336; 428/425.8; 428/461; 428/469; 428/472.2; 428/472.3; 428/518
[58] Field of Search ......... 428/35.8, 35.9, 36.6, 428/36.7, 336, 216, 156, 412, 472.3, 425.8, 469, 461, 484, 500, 517, 518, 327, 472.2; 204/56.1, 518

[56] References Cited

U.S. PATENT DOCUMENTS

| Re. 29,739 | 8/1978 | Kessler | 204/56.1 |
| 4,559,266 | 12/1985 | Misasa et al. | 428/516 |
| 4,608,286 | 8/1986 | Motoishi et al. | 428/516 |
| 4,861,647 | 8/1989 | Ishikawa et al. | 428/35.9 |
| 4,980,210 | 12/1990 | Heyes | 428/35.9 |

FOREIGN PATENT DOCUMENTS 407313 9/1991 European Pat. Off.
2003415 3/1979 United Kingdom.

Primary Examiner—Paul J. Thibodeau
Assistant Examiner—Hoa T. Le
Attorney, Agent, or Firm—Dennison, Meserole, Pollack & Scheiner

[57] ABSTRACT

The invention relates to a strip or portion of a strip for deep drawing or drawing and ironing comprising a metallic layer carrying on one surface a surface coating of plastics material and on its other surface a coat of varnish characterized in that: the metallic layer is of aluminum alloy with each surface having a coating of anodic or chemical conversion oxide 20 to 80 nm thick; and the coat of varnish contains a solid lubricant consisting of particles which are harder than the varnish and less hard than the shaping tool or tools, which particles are of an average diameter greater than the thickness of the said coat after firing. The invention also has an object the use of this strip to produce various hollow bodies or containers, particularly with a height:diameter ratio in excess of 2.5 and for producing aerosol or pump distributors. Thus transformed, the strip according to the invention can be applied to various fields such as those of cleaning products, hygiene, foodstuffs, cosmetics and pharmaceuticals.

20 Claims, 6 Drawing Sheets

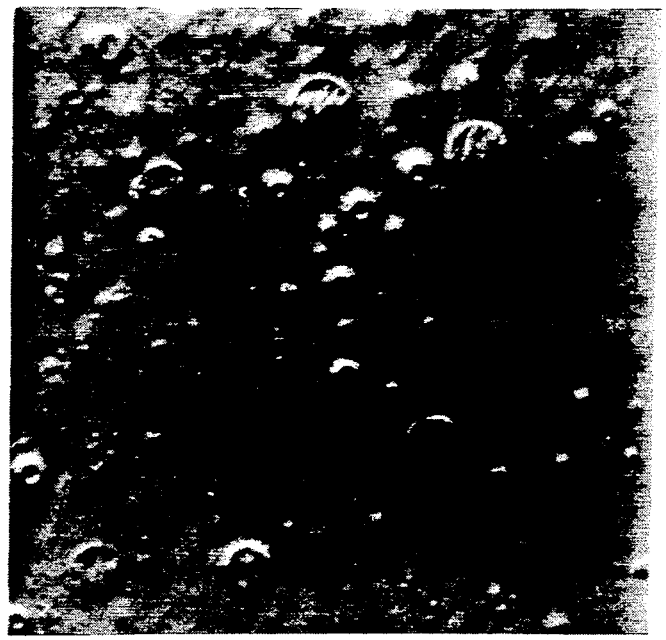
FIG. IA
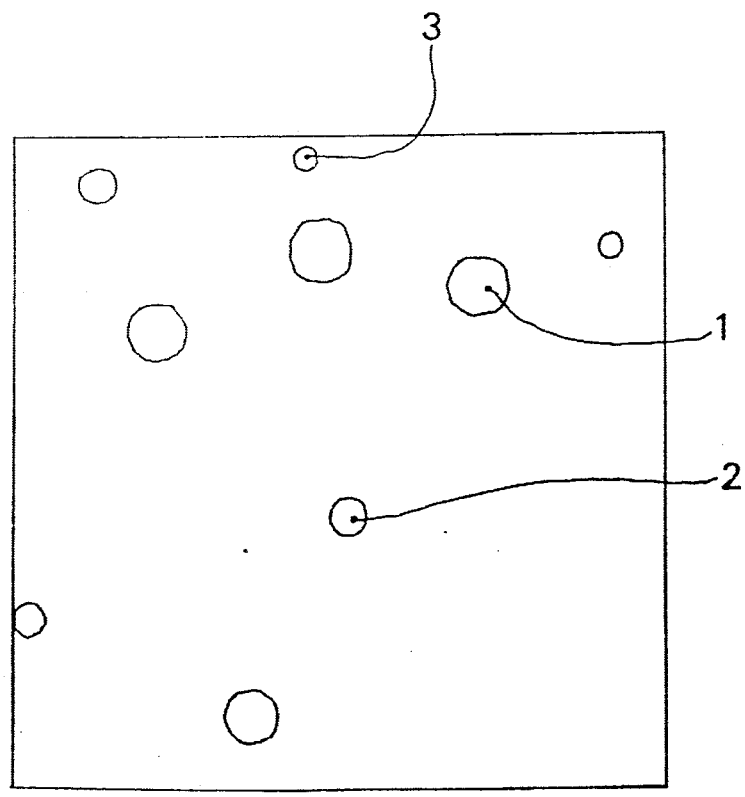
FIG. IB

ALUMINUM-BASED COMPOSITE AND CONTAINERS PRODUCED THEREFROM

BACKGROUND OF THE INVENTION

The invention relates to multi-layer aluminum based strips for deep drawing and ironing as well as the drawn products and receptacles obtained from these strips.

English Patent No. 2 003 415 describes a method of drawing and ironing a strip of aluminum having at least one surface coated with a plastics film while the other is either covered with plastics film or partially enamelled, for producing drinks cans or cans for preserved foods, where the plastics film is on the outside. The resultant receptacles, quoted by way of example, have a height::diameter ratio of approx. 2.

The Applicants have sought to obtain hollow drawn or drawn and ironed bodies of aluminum alloy of greater height in order to produce aerosol cans. The manufacture of such cans which may have an H:D ratio (height:diameter) of 3 to 4, typically comprises the impact extrusion of an aluminum alloy slug followed by various surface treatments, coatings and firing treatments and then the decoration and conical shaping and rolling of the edge for the attachment of a valve. The Applicants have also sought to simplify the operations or treatments which follow the shaping of the can.

SUMMARY OF THE INVENTION

The first object of the invention is a strip or portion of a strip for drawing or drawing and ironing comprising a layer of metal coated on one surface with a layer of plastics materials and on the other a layer of varnish characterised in that:

a) the metal layer is of aluminum alloy comprising on each surface a coating of anodic chemical conversion oxide of a thickness between 20 nm and 80 nm;

b) the coat of varnish comprises a solid lubricant having particles than the varnish and less hard than the shaping tools.

The strip or portion of strip according to the invention is particularly surprising firstly by the behaviour of its varnished surface during drawing and then ironing: by reason of the action of the solid particles present in the varnish situated on the outer surface of the deep drawn product and more precisely by virtue of the fact that some of these particles appear on the surface, this outer surface is to a certain extent "self-lubricated" and it is possible to dispense with the viscous lubricant normally used, the working surfaces preferably being wetted with water in the case of series manufacture. Then, the water has a three-fold purpose: cooling of the tools, evacuation of solid particles which may have become detached during working and improved slip between the part and the tools. Generally, elimination of the conventional lubricant has quite substantial consequences on the economics of hollow bodies manufacture such as cans of the aerosol type, both by the elimination of the lubricants and of their reprocessing and by the elimination of the grease removal and thermal treatment operations which they render necessary.

With regard to the interior of the deep drawn product, the surface layer of plastics material is, like enamel, readily adherent to the aluminum alloy core by virtue of the layers of anodic or chemical conversion oxide present on the surfaces of the core. It remains sealing tight during deformations and will act as a barrier vis-a-vis the contents or aggressive agent on the inside, so that the interior finishing operation can be omitted. In respect of the stamping or deep drawing tool, this plastics coating avoids any metal-on-metal sticking and in conjunction with the outer varnish in which it was noted that the solid particles went so far as to play a sacrificial lubricant role during the course of the successive shaping operations, it makes it possible to achieve particularly high height:diameter (H:D) ratios during stamping-drawing or drawing and ironing.

In the ensuing description, the term "Al strip" will be used to describe the strip or portions of strip of aluminum or aluminum alloy treated superficially according to the invention; similarly, "multi-layer strip" will refer to the Al strip coated according to the invention with varnish and with a solid lubricant on a surface corresponding to the outside of the packaging and with a coating of plastics material on the other surface corresponding to the interior of the packaging.

Suitable aluminum alloys according to the invention are those conventionally used in the field of hollow bodies for packaging purposes, such as cans, aerosols, cans for the agricultural-foodstuffs industry, and closure caps. Aluminum Alloys such as those of series 3000, for example 3004, those of the series 5000, for example 5052, are suitable: these alloy designations correspond to the Aluminum Association Standards. It should be noted that the excellent suitability of the multi-layer strip according to the invention for drawing and ironing makes it possible to include a strip of Al alloy which is of lesser performance in this respect, the problem of surface defects during ironing being resolved by the lubricant particles of the outer layer.

Surface treatments of aluminum, including for example anodization, chemical conversion, are known as ways of improving the adhesion to the Al strip of polymers, adhesives and paints.

The Inventors have found that among the vast number of possible surface treatments, certain special conditions made it possible to develop the adhesion to carry out the invention, viz an anodic oxidation of the two surfaces of the Al strip, in the presence of phosphoric acid and producing an anodic coating of a thickness between 30 nm and 80 nm, and preferably of between 40 and 80 nm. It is also possible to carry out a phosphochromic chemical conversion treatment producing a coating of a thickness between 20 and 60 nm. While preferring anodic oxidation, the Inventors noted that optimum adhesion was possible with coating thicknesses and treatments such as are defined hereinabove.

According to the invention, the surface of the Al strip corresponding to the outside of the deep drawing operation is coated with a varnish containing a solid lubricant consisting of micronized particles.

The Inventors have found that it was possible to use varnishes normally employed in the manufacture of hollow bodies for packaging, such as epoxy phenol, epoxy urea, vinyl organosol, polyester, and acrylic paints with a dry paint thickness on the Al strip of between 1 and 8 $\mu$m and preferably between 2 and 5 $\mu$m. These varnishes, according to the invention, contain 0.1 to 10% by weight in relation to the weight of dry varnish of solid lubricant consisting of micronized particles having a mean diameter between 1 and 30 $\mu$m and preferably between 2 and 20 $\mu$m, and even more preferably between 10 and 20 $\mu$m, the mean diameter corresponding to the average of the largest dimensions of these particles which are not necessarily spherical. Preferably, the varnish contains 0.5 to 5% by weight of solid lubricant.

By convention in the present application a solid lubricant is a micronized substance which is insoluble or not readily soluble in varnish with a softening point of higher than 60° C. and consisting of particles which are harder than the varnish and less hard than the shaping tools. These discrete particles provide points of contact with the outer tools so that they perform an anti-friction role.

Thus it is possible to use as a solid lubricant micronized particles of plastic materials such as polyethylene (PE), polypropylene (PP), polytetrafluoroethylene (PTFE), and non-polymerized organic substance such as fatty acid amides; it is possible to use mixtures of particles which differ in their size and/or chemical nature. The particles of PE and PP do not spread out during shaping operations, and those of PE typically have a molecular weight in excess of 100,000.

These solid particles have a mean diameter which is preferably chosen in relation to the thickness of the coat of dry varnish and this mean diameter must be greater than 1 and preferably between 1 and 10 times the thickness of the coat of dry varnish and even more preferably between 4 and 10 times this thickness. Thus, very surprisingly, solid lubricant particles of a mean diameter of 10 to 20 μm gave remarkable results in a coat of varnish 2 μm thick in the dry state, the stresses of deep drawing and ironing then being greatly diminished. In addition to the solid lubricant, the varnish may contain other fillers such as colouring agents, for example 1 to 5% titanium oxide based white pigment, this limitation to less than 5% being imposed in order not to compromise the ductility of the varnish to which the pigment is added. In the case of a distributor, the surface area of which has to be decorated, the even pale colour obtained with this pigment on the deep drawn-ironed can or receptacle will make it possible to use as an undercoat a less dense coating requiring heat treatment at a lower temperature or a shorter treatment. The corresponding simplification of the equipment and production relate for example to the case of dispensers which have a white undercoat.

Curing of the coat of varnish filled with solid lubricant is carried out under conditions of temperature and duration which are generally between 120° and 250° C. for periods ranging from 15 seconds to 15 minutes, permitting of total curing and the development of maximum adhesion.

In the multi-layer strip of the invention, the surface coating of plastics material covering the surface corresponding to the inside of the deep drawn product has a thickness between 15 and 100 μm and, preferably, between 30 and 60 μm, adhering to the strip and constituting an inert barrier between the aluminum and the possibly aggressive contents of the hollow body. Preferably, this film has an elongation rate of more than 200% in all directions.

According to a first embodiment of the invention, an adhesive is used to cause the aforesaid surface coating of plastics material to adhere to the Al strip. This adhesive is applied in a layer of 0.5 to 10 μm thickness and of preferably 2 to 4 μm thickness and the surface coating or film of plastics material is of polyolefin such as polyethylene (PE), particularly HD-PE, polypropylene (PP), a copolymer of PE and PP, a copolymer of PE or PP with another olefin, this film having a thickness between 20 and 80 μm and, preferably, between 30 and 60 μm and having an elongation rate of more than 200% both lengthwise and crosswise. Polyurethane adhesives are suitable.

The adhesive may be applied by coating of the Al strip preheated to above 50° C. If the adhesive contains solvents, these are eliminated after coating by any known means such as passing through an oven, and prior to application of the plastics film. If the adhesive does not contain any solvent, it is preheated to have a fluidity which permits its application. The thickness of adhesive is so chosen that there can be no part of the strip which is without adhesive; indeed, the use of a long length of strip increases the risks of lack of flatness or dimensional irregularity of the strip, particularly in terms of thickness in the crosswise direction; it is therefore also as a function of the regularity and flatness of the Al strip that the thickness of adhesive is chosen.

The polyolefin film is applied to the Al strip coated with adhesive and preheated to a temperature of above 50° C. and which may be as high as the melting temperature of the film; in manner known per se, this application may be carried out by passing the Al strip coated with adhesive and the polyolefin between two presser rollers, one of which may be heated while the other may be covered with PTFE, the expression "Al strip" designating either the continuous strip generally in the form of a coil, or the portion of strip or format.

The film of polyolefin may contain additives or fillers normally chosen as a means of imparting a particular appearance, such as soluble dyes or pigments, whether they are mineral or organic, or in order to impart tribological properties, for example 0.1 to 0.5% by weight ethylene bistearamide. It can also undergo a surface treatment such as a corona treatment reinforcing adhesion at the adhesive/film interface, or such as a surface fluorination imparting to the outer surface of the film a surface hydrophobia and oleophobia facilitating shaping of the multi-layer strip into a deep hollow body and limiting possible interaction between the inside of the packaging and its contents.

According to a second embodiment of the invention, the adhesive is a generally extrudable mixture of at least 50% by weight of an acid copolymer and at most 50% by weight polyolefin, of a thickness comprised between 2 and 10 μm and preferably of between 4 and 8 μm; the form of plastics material, bonded to the Al strip by this layer of adhesive is a mixture of at least 50% by weight polyolefin and at most 50% by weight acid copolymer of a thickness comprised between 20 and 80 μm and preferably between 30 and 60 μm.

The term acid copolymer is used for extrudable adhesives capable of producing adhesion between a polyolefin film and a strip of aluminum, adhesives which are generally obtained by the copolymerisation of organic anhydrides, olefins or acids and possibly unsaturated esters. By way of example of acid copolymers, those sold under the trademarks: PRIMACOR, HERCOPRIME, LOTADER, OREVAC may be used.

The Inventors have found that multi-layer strips obtained by this second method exhibited better behavior under severe stamping, drawing and ironing, using only multi-layer strips comprising layers of acid copolymers and extruded polyolefins, unmixed. According to an alternative, it may be advantageous to change from a covering comprising 2 coats (adhesive +surface coat) to a covering with 3 or more coats, of improved adhesion, having a bonding coat containing over 50% acid copolymer on the Al strip side, an intermediate layer with 45 to 55% acid copolymer with the additional polyolefin and an outer polyolefin-based coating. According to another alternative, it is also possible to use the coextrusion with 3 coats or more in order to improve its barrier effect, for example with an intermediate coating of 3 to 10 μm of PVDC or EVON, bonded to the Al strip and to the outer layer of polyolefin by adhesive coatings.

Use of the second method according to the invention is preferably carried out by coextrusion of all coatings and layers simultaneously rather than by extruding one coating at a time. The simultaneous coextrusion of the coatings may be carried out directly on the Al strip, in a roll, preheated prior to coextrusion. It is likewise possible simultaneously to coextrude the layers or coatings in order in a first stage to obtain a multi-layer film and, in a second stage, to cause this multi-layer film to adhere to the Al strip by passing the preheated Al strip and the multi-layer film between two presser cylinders, possibly heated and coated as in the first embodiment of the invention, the adhesive face of the film being on the side facing the Al strip. Coextrusion makes it possible to incorporate additives or fillers such as dyes and slip-promoting agents respectively into the intermediate layer and into a transparent surface layer in the case of simultaneous coextrusion of 3 layers.

According to a third method of the invention, it is possible to apply the polyolefin film to the Al strip by exerting a pressure, the Al strip being preheated to a temperature permitting fusion of the film, at least on the part of the film in contact with the Al strip, which is produced by calendering, possibly followed by rapid cooling of the Al strip which is thus coated. Advantageously, the polyolefin film undergoes a corona treatment before application. The low density linear PE is suitable for this method.

The second object of the invention is the use of a strip or portion of a multi-layer strip obtained according to the invention in order to produce a receptacle purely by stamping or typically by drawing and ironing the strip or portion of strip, its outer layer of varnish containing a solid particulate lubricant being disposed on the outside of the receptacle. Thus it is possible to obtain deep receptacle of which the previously-defined H:D ratio is typically greater than 2.5 and even more typically is between 3 and 5. Such an H:D ratio exceeds the H:D ratio of preserves cans and commercially available beverage cans, this ratio being generally less than 2. The receptacles obtained are normally decorated.

This use typically includes a first stage of drawing and ironing the multi-layer strip which employs conventional industrial equipment but with no need for an external lubricant. It may be necessary to cool the tools, particularly the drawing dies, which according to the invention is carried out by spraying them with water to which a small quantity of surfactant is added to promote wetting of the tools and of the multi-layer strip at any stage of its shaping. The surfactants may be anionic, cationic or neutral, based on ethylene oxide, and they are used at the rate of 0.01 to 3% by weight in relation to the water and preferably 0.05 to 0.5% in order to lower the surface tension of the water to below $30.10^{-3}$ $N.m^{-1}$. The surfactants which comprise fluorinated groups or chains, such as those sold by the company ATOCHEM under the registered trade mark "FORAFAC" are particularly effective.

The drawing and ironing are advantageously followed by a stage involving decoration by printing, which may be performed directly on the outer varnish such as is obtained following the drawing and ironing process. The varnish, although directly subjected to high mechanical stresses by the drawing dies continues to adhere to the metal remarkably well and therefore constitutes a quality backing for the application of the various decorative elements by printing or coating, whether they are white coats, inks, or over-printing paints, followed by curing by heat treatment or possibly by irradiation (ultraviolet light or electron beams). Taking into account the thermal treatments often for curing and printing and also taking into account the fineness of the decoration, which may include portions which have a metallic aspect by exposure of the aluminum layer, it is recommended to have a receptacle the outside of which is covered by a very thin coat of varnish rather than a plastic film, such a film being less stable under heat than a varnish which is completely fired.

Tests conducted by the Inventors have demonstrated the essential role of the solid lubricant in the production of receptacles with a high H:D ratio varnished on the outside and made by a drawing and ironing process.

The strip or portion of strip according to the invention is advantageously used for producing cans for preserve foodstuffs or preserves cans for drinks which may also be referred to as "drink cans". It may also be used for the production of other drawn and ironed packaging elements, for example closure or over-sealing caps.

One particularly interesting use for the strip or portion of strip according to the invention is the manufacture of a can of the aerosol type which has an H:D ratio which is often greater than or equal to 2.5 and which is typically between 3 and 5. To obtain an aerosol dispenser or a pump dispenser from such a can, there is preferably associated with it an annular dome fixed in sealing-tight manner on the top end of the said lateral wall of the can. This dome is of plastics material and comprises an annular shell of a minimal thickness comprised between 1.2 and 4 mm and also two annular portions, one upper and one lower, permitting the dome to be mounted respectively on the lateral wall and on distributing means, the fixing portions extending and framing the annular shell. This plastics dome is rigid and its thickness is chosen so that it can withstand the shocks of handling and also the internal pressure when the body is intended to be used as an aerosol dispenser. The dome is itself a molding which is simple to produce and light in weight, and its shape matches the base and makes it possible to use a can, the top end of which is slightly restricted in a normally straight annular portion, that is to say having generatrices of axial directions, or in a portion which carries a rolled edge.

In comparison with the case of a metal can produced in a single piece with its top end narrowed to a dome, the thickness of the lateral wall of a multi-layer can according to the invention need only be 0.5 to 0.65 times what it has to be in the prior art case of a narrowed monoblock dome in order to withstand a given pressure, which is a surprising result and a considerable economic advantage. In the case of a can with a narrowed dome according to the prior art, the thickness of the wall or at least the thickness of its top part is indeed a function of the deformation with a narrowing and this thickness is then typically 1.5 to 1.8 times the thickness which would be necessary to withstand the pressure by itself. The slight narrowing of the end of the can in the present case makes it possible to avoid the additional thickness which is thus linked to deformation with a considerable narrowing and produces a surprising saving on material. This narrowing of the top end of the can corresponds typically to a difference between the overall diameter of the body and the inside diameter of its top narrowed opening, between 4 mm and 12 mm and the thickness of the lateral wall of which more than 90% is Al or alloy corresponds as follows to the outside diameter of the wall, the thicknesses shown in parentheses relating to a drawn tubular body of the prior art:

- ⌀ 0 33 mm to <47 mm: thickness 0.15 to 0.20 mm (0.30 to 0.35 mm)
- ⌀ 0 47 mm to <55 mm: thickness 0.20 to 0.25 mm (0.35 to 0.4 mm)
- ⌀ 0 55 mm to 80 mm: thickness 0.25 to 0.35 mm (0.4 to 0.6 mm).

The slight narrowing and the considerable saving on metal associated therewith are considerable advantages of the new structure of the dispenser body and of dispensers obtained by the invention. Furthermore, as will be seen in Example 4, there may be on the outer varnished surface of the can and therefore at the level of the sealing-tight assembly of its necked part, in a straight portion and on the dome, small areas of bare metal providing local contacts or proximity of plastics and metal which are always far less subject to corrosion than metal/metal contacts, such as occur in the prior art shrinking of the fixing cap of a valve onto a tin can.

The plastics dome is fixed in sealing-tight manner on the top end of the can using methods which are suitably adapted to series production and exhibiting the following principles: gluing, welding of a connecting member, production of a synthetic plastics fastener produced either by injection into the interior of the rolled edge around the top of the tubular member or by rotation welding (by friction) of a synthetic plastics member which is held captive by the said rolled edge; friction welding onto the top end of the can.

These various methods and the arrangements which result therefrom will be illustrated by the examples. Thus, according to a variety of methods, dispenser bodies are obtained of which the top ends will be fixed in sealing-tight manner to the fixing dome of the valve or of the dispenser pump, typically by shrinking onto the externally convex top end of the annular dome. The annular dome is normally of one of the materials of the group comprising the polyamides, polycarbonates, polyesters, polyacetal, polypropylene and polyethylene.

To meet the demands for resistance to internal pressure in the case of aerosols, for example an internal pressure of 1.2 MPa, or the need for resistance to vacuum in the case of dispensers fitted with a pump which preferably has no facility for air return, the annular shell of the annular dome has a minimum thickness which is preferably between 1.5 and 3 mm. In the case of a dispenser with a pump with no air return facility, the intake orifice or nozzle of the pump must be provided with a tube which is immersed as far as the bottom of the can and the initial filling of liquid or cream in the can must be not more than 75% of the interior space in order to achieve dispensing without incident.

ADVANTAGES:

The invention offers numerous advantages of a technical and economic nature compared with the prior art. At the present time, deep receptacles with an H:D ratio of better than 3, such as aerosol cans, typically entail 5-stage production:

a) shaping of the slugs by extrusion or the drawing and ironing of the bare Al strip;
b) degreasing and/or heat treatment to remove lubricants and/or surface treatment to have an outer/inner surface adapted to ensure the adhesion of varnish to the inside and of various coats of a printed decoration on the outside;
c) interior varnishing with a firing of the varnish
d) decoration by the application of white coats, ink, over-print varnish with curing
e) conical shaping and shaping of the edge according to the envisaged type of closure.

Compared with this known method of obtaining deep containers with an H:D ratio of better than 3, the method according to the invention offers the following advantages:

1) total elimination of external lubricants at the drawing and ironing stage, which is an economic advantage and also an advantage in terms of hygiene, safety and the treatment of residual liquids, these lubricants generally being liquids of an organic nature and therefore difficult to treat;
2) elimination of the degreasing and/or heat treatment or surface treatment stages;
3) elimination of the internal varnishing and the associated firing stages because the container obtained according to the invention makes it possible to package products without any need to add an additional protective coating;
4) possible choice of any aluminum alloy suitable for packaging without being restricted by a problem of "galling", that is to say the tearing away of metal by the drawing dies. The equipment savings which result can be added to the savings in production.
5) the narrowing or necking of the top end of the multi-layer can according to the invention associated with an annular dome of plastics material according to the invention is small, the dome achieving the essential part of the reduction between the outside diameter of the can and the fixing diameter of the valve or dispenser pump. In this case, the main advantages are:
    easier finishing of the can;
    the possibility of greatly reducing the thickness of its lateral wall, typically by a relative 35 to 50%;
    a considerable reduction in the risks of corrosion at the point of the sealing-tight fixing between the dome and the can;
    simplicity and viability of the methods of assembling dispensers.

BRIEF DESCRIPTION OF THE DRAWINGS

FIG. 1A is a photograph enlarged 500 times showing an Al strip varnished according to the invention, the photograph showing the varnished side.

FIG. 1b is a diagram showing the essential elements of FIG. 1A.

The same reference numerals are used to designate similar elements performing the same function.

DESCRIPTION OF THE PREFERRED EMBODIMENTS

EXAMPLE 1 a) Preparation of the Al strip

A strip of 3004 aluminum alloy in the condition H19 and having a thickness of 500 μm has had both its surfaces subjected to degreasing in the presence of phosphoric acid followed by an anodic phosphoric oxidation producing a coating of oxide 60 nm thick.

b) Preparation of the multi-layer strip

In a first stage, varnishing of the surface of the Al strip which is to become the outer surface of a container: by coating, a mixture of acrylic type varnish (varnish No. 326412 produced by HOLDEN) and 1.5% by weight solid lubricant consisting of a mixture of PE/PTFE particles of a mean size or diameter of 2.5 μm with a maximum of 9 μm (reference TF 1778 of LANGER & CO) was applied to one of two surfaces of the Al strip 5 in order to form, after complete curing of the varnish for 12 minutes at 180° C., a dry coat of varnish 6 (FIG. 2) 2 μm thick.

Typically, curing was carried out at between 160° and 260° C. over periods ranging from 15 seconds to 15 minutes, the high temperature firing associated with a short time requiring continuous treatment of the Al strip in a belt type furnace whereas firing at a lower temperature associated with a longer time generally assumes the strip to have been previously cut into strip portions referred to as formats.

Figure 2:
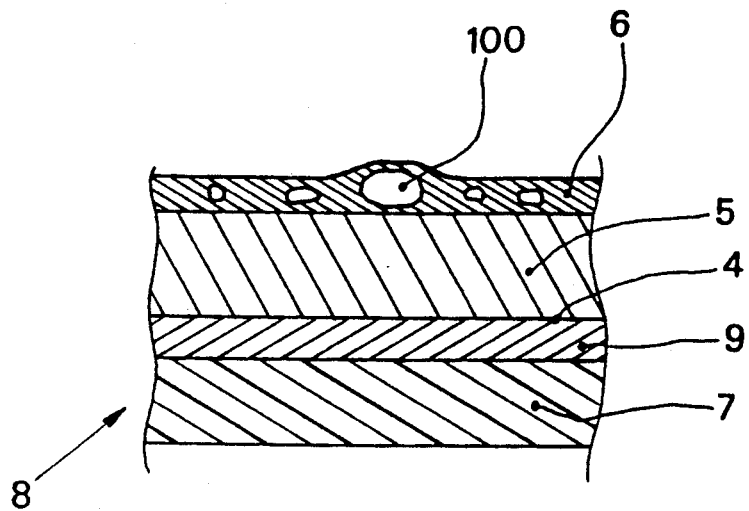
FIG. 2 shows in section a multi-layer strip comprising the aforementioned varnished Al strip.

Examination of the varnished surface obtained here (FIGS. 1A and 1b) under an electron scanning microscope shows a vast number of generally circular protuberances or bosses, for example the protuberances 1, 2 and 3 which have diameters of 16, 10 and 6 μm respectively, forming slight reliefs on the surface of the varnish and corresponding to the presence of particles 100 of solid lubricant shown diagrammatically in FIG. 2.

2. In a second stage, the other face 4 of the Al strip 5 already coated with varnish 6 is coated with a film of PP (polypropylene) 7, so obtaining a multi-layer strip 8 according to the invention (FIG. 2). For this, a coating of polyurethane adhesive 3 μm thick, reference 3640 produced by HENKEL is applied by coating onto the other face 4 of the Al strip which has been preheated to about 60° C. After evaporation of the solvents, the "cast" quality PP film 7 with a thickness of 50 μm and an elongation of 400 to 600% in all directions was applied by calendering, the Al strip coated in this way and the film of PP being caused to circulate between two rollers in such a way as to cause the PP film to adhere to the layer of adhesive by pressure. One of the two rollers is heated, the other, in contact with the PP film, is covered with PTFE which does not adhere to the PP nor to the even molten PE. Thus, a multi-layer strip is obtained which is to be shaped.

EXAMPLE 2

Figure 3:
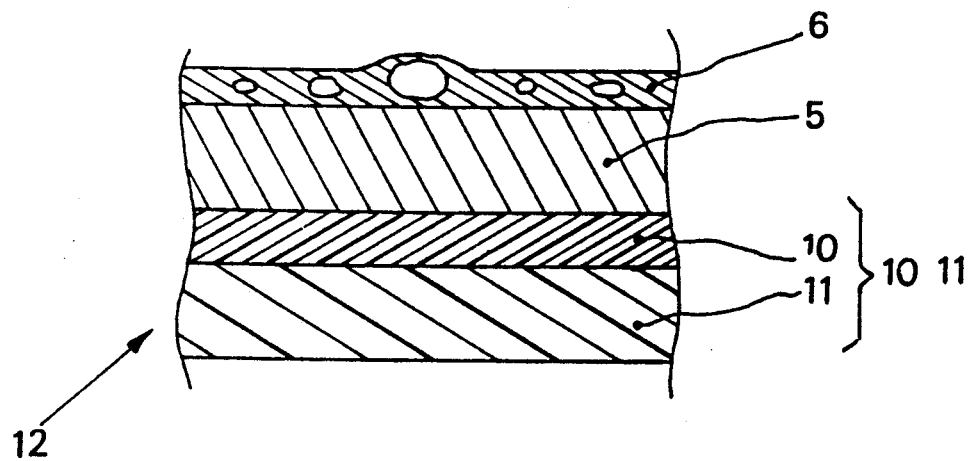
FIG. 3 shows in section a second multi-layer strip comprising a portion of the same varnished Al strip.

Coextruded with a flat die onto the Al strip varnished on the other surface and preheated to 160° C. was a bi-layer complex 10+11 consisting of:
a first layer 10 (on the metal side) of 8 μm consisting of a mixture by weight of 85% EAA (ethylene-acrylic acid) based acid copolymer and 15% HDPE (high density polyethylene). This layer 10 is intended to ensure a connection between the anodic layer of aluminum alloy and the second layer;
a second outer layer 11 40 μm thick, consisting of a mixture by weight of 80% HDPE and 20% EAA, with an elongation of 400 to 600% in all directions, so producing a multi-layer strip 12 according to the invention (FIG. 3) in which the successive layers are: the coat of paint 6, the layer of aluminum 5, the connecting layer 10 and the surface layer of ductile plastics material 11.

EXAMPLE 3

This example differs from Example 2 in that instead of extruding onto the Al strip a multi-layer complex, there was separately prepared by annular extrusion a multi-layer complex film of the same composition and thickness as that described in Example 2. This film was then applied by calendering onto the varnished Al strip once this had been preheated in a manner similar to that described in Example 1.

EXAMPLE 4

This example describes the shaping of the multi-layer strip in Example 1, the hollow body to be obtained having a diameter (D) of 47 mm and a height (H) of 160 mm, in other words an H:D ratio of 3.4.

The shaping of the multi-layer strip comprised a first drawing step followed by a second ironing step, as follows:

| Operation | D (diameter) | H (height) | Thickness of skirt | H:D |
| --- | --- | --- | --- | --- |
| Drawing | | | | |
| cutting of a circular blank | 127 mm | — | — | — |
| 1st pass | 65 mm | 45 mm | 0.55 mm | 0.7 |
| 2nd pass | 47.6 mm | 77 mm | 0.55 mm | 1.6 |
| Ironing | | | | |
| 1st die | 47.4 mm | 100 mm | 0.40 mm | 2.1 |
| 2nd die | 47.3 mm | 115 mm | 0.35 mm | 2.4 |
| 3rd die bringing to uniform length | 47.0 | 160 mm | 0.25 mm | 3.4 |

This shaping could be carried out continuously from the multi-layer strip itself or after it has been cut into portions of strips or formats.

Ironing was carried out under a spray of water to which was added 0.1% by weight of surfactant FORAFAC (registered trademark), so that the water especially wetted the outer surface of the cup obtained after deep drawing, with the threefold object of cooling the drawing dies, reducing the risks of damage to the inner and outer surfaces of the hollow body and eliminating any soil or residue such as particles of solid lubricant which may have been torn away during drawing.

Figure 4A:
FIGS. 4A and 4b show in the same way as FIGS. 1A and 1b the outer surface of the multi-layer strip of FIG. 2 after stamping or drawing.
Figure 4B:
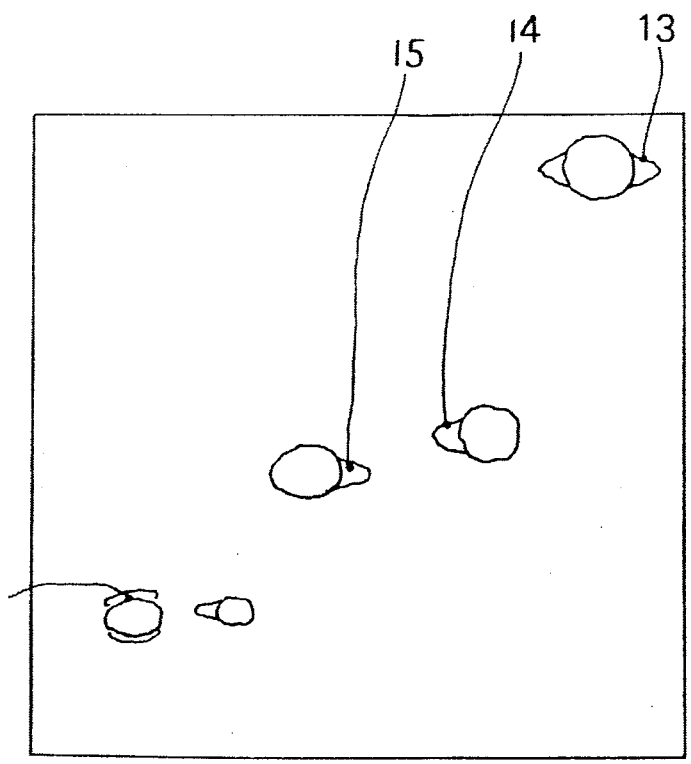

Examination of the outer surface of a deep drawn part which has not yet been ironed, under an electron scanning microscope to an enlargement of 500× as in FIG. 1A, showed that the particles of solid lubricant were still present, from the protuberances such as 13, 14, 15 and 16 (FIG. 4A and FIG. 4b showing the contours of the protuberances or reliefs) and that they are not very greatly misshapen by the deep drawing process. However, a separation can be noted between varnish and particle in front of and/or at the rear of certain particles, corresponding for instance to the reliefs 13, 14 and 15, that is to say to particles which are generally the largest. These V-shaped failures are orientated in the axial direction of the deep drawing process.

Figure 5A:
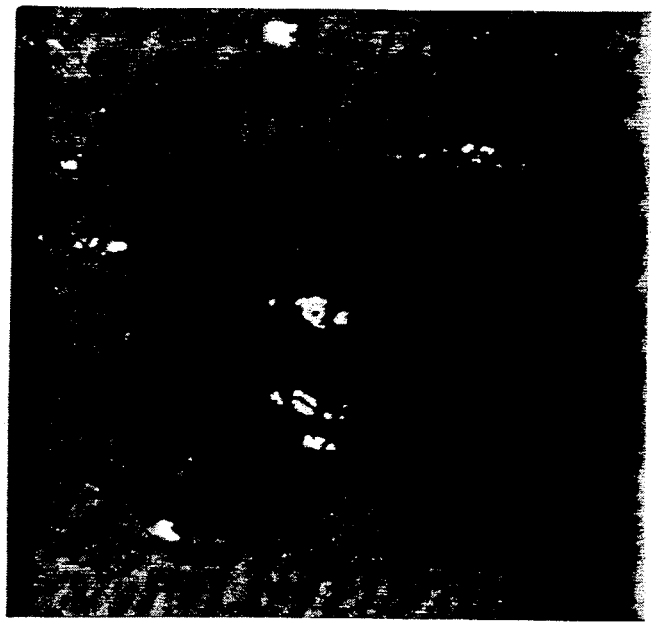
FIGS. 5A and 5b show in a similar manner the outer surface of the same strip after drawing and ironing.
Figure 5B:
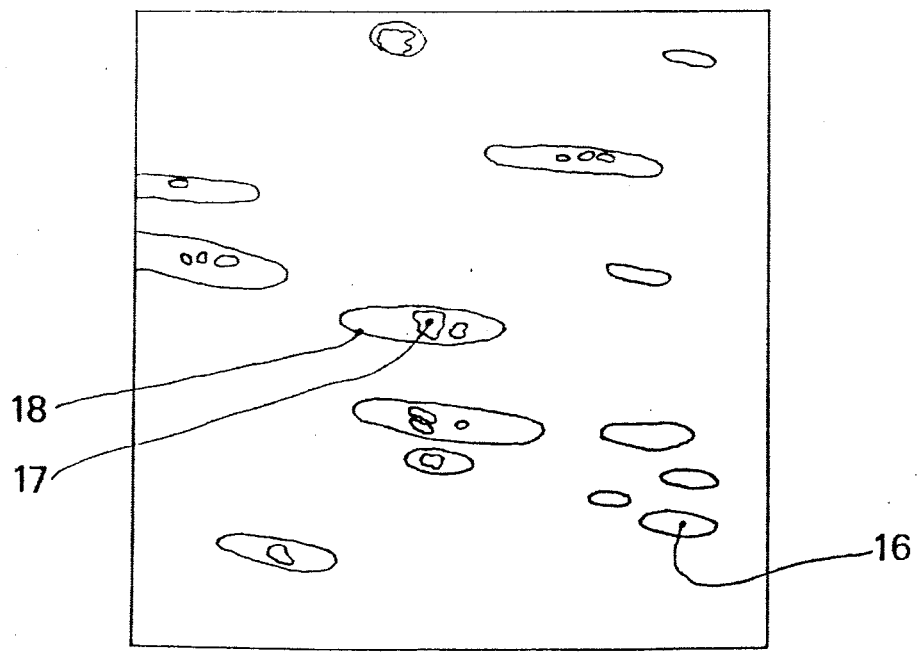

Examination under a microscope (FIG. 5A) of the same outer surface of the skirt produced by the drawing shows that the majority if not all the particles of solid lubricant have disappeared from the outer surface of the skirt which has been subjected to the drawing-ironing stage; only traces are to be seen in hollows left in the varnish by the particles which are harder than the varnish in the form of greatly elongated ellipses of different sizes (see FIG. 5b in which traces 16 and 17 have been marked to facilitate their identification). It will also be noted that the varnish, although its final thickness is very slight, has remained adhering to the metal; however, it can sometimes be noted in the heart of elliptical traces such as 16 that there are tiny zones 18 of bare metal (the surface which is thus exposed is assessed at less than 3%) which seem to correspond to zones where the largest particles are or are almost tangent to the metal, zones which are exposed by such particles being torn away.

Thus, the particles of solid lubricant behave in the manner of "sacrificial" lubricating particles which are progressively eliminated during the ironing, the largest first and the smallest at the end of the ironing stage.

Upon visual examination, the inner surface shows a uniform aspect. Electrical conductivity tests, referred to as the "WACO test", which make it possible to measure the degree of damage to an inner coating by measuring at a constant voltage the strength of current passing between a metallic hollow body, its saline solution-based contents and a central electrode, were carried out on samples at the end of the deep ironing stage and after each drawing pass (Table 1):

TABLE 1

| Hollow body D × H | Height of filling (in 20% NaCl solution) | Strength (under 6.3 Volts) |
| --- | --- | --- |
| 47.6 × 77 | 50 mm | 0 mA |
| 47.4 × 100 | 80 mm | 0 mA |
| 47.3 × 100 | 80 mm | 0.5 mA |
| 47 × 160 | 120 mm | 1 mA |

Taking into account the surface tested, strength values below 5 mA are considered as acceptable. The strength values obtained clearly illustrate the low porosity obtained after shaping so that however things may be this inner surface is adapted to the packaging of even aggressive products with no need for additional treatment.

EXAMPLE 5

Figures 6, 7:
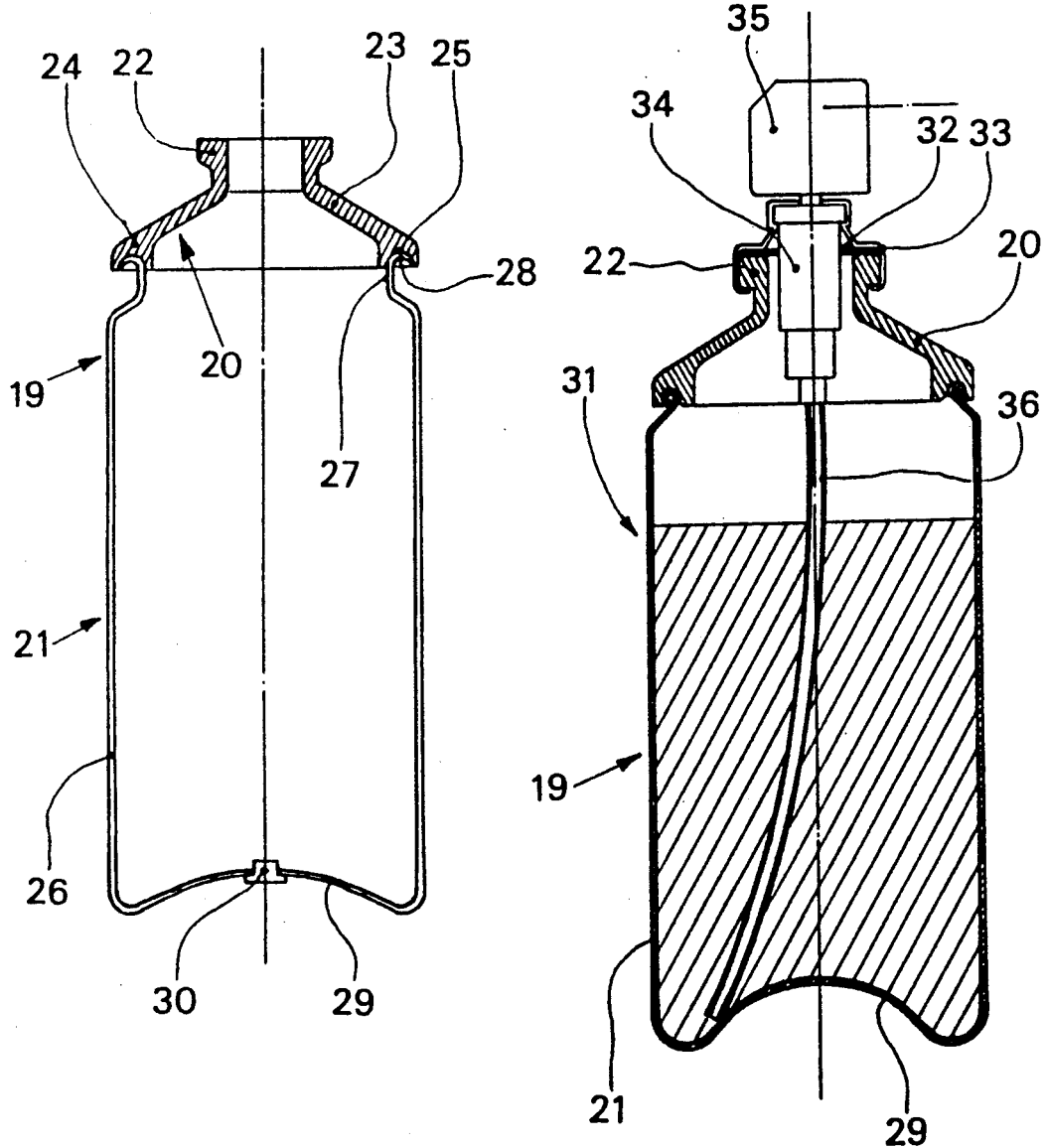
FIG. 6 shows a dispenser body according to the invention in cross-section.
FIG. 7 shows a dispenser with a pump, produced from a dispenser body of the same type, in cross-section.

The article (dome+casing) 19 or dispenser body 19 in FIG. 6 comprises a dome 20 of high density polyethylene (HDPE) and a multi-layer can or casing 21 obtained by the drawing and ironing procedure according to Example 4 followed by operations to prepare its top end. The dome 20 comprises at its top end an external bulge 22 with an outside diameter of 20 mm constituting a ring onto which the distributing means can be shrunk.

It also comprises below this ring 22 a shell 23 of substantially constant thickness 2.3 mm and then a lower widened circular portion 24 with an outside diameter of 45 mm and an inside diameter of 39 mm comprising at its end an open circular groove 25 with a semicircular profile of radius 1.5 mm in cross-section and with a mean diameter of 42 mm. The total height of the dome 20 is 18 mm.

The casing 21 has a cylindrical body 26 which is 0.25 mm thick and a narrowed opening 27 with a diameter of 36.5 mm surmounted by an outer edge 28 over about 150° with an external radius of 1.3 mm. Fixing of the dome 20 on the rolled edge 28 was carried out by surface oxidation of the circular groove 25 in the dome 20 (corona treatment) and by gluing using a cyanoacrylate glue on this groove 25 which is fitted onto the rolled edge 28 and maintained in contact therewith for 15 seconds while the glue dried. The gluing technique employed results from tests; cyanoacrylate glues have been found to be far preferable to silicone glues for industrial applications, the pressing times and above all drying times being excessive with the latter. Polyurethane glues have likewise proved satisfactory. Other known methods of treating the surface of the groove of plastics material 25 may be used, for example a flame treatment or treatment using a shaped electrode (corona effect).

The casing 21 is in this case intended to be used for an aerosol and its monoblock bottom 29 comprises an orifice for the introduction of a pressurized propellant gas and a stopper 30 for the sealing-tight closure of this orifice.

EXAMPLE 6

A dispenser body 19 identical to the body 19 in FIG. 6 except for the bottom 29 of its casing 21 which is sealing-tight was used to produce a pump dispenser 31 (FIG. 7). For this, using a sealing-tight joint 32, the metallic fixing dome 33 of the pump 34 which is here surmounted by a diffuser 35, was shrunk onto the top convexly bulging end 22 of the dome 20. This pump 34 is a pump with no facility for air return, that is to say with no communication between the inside and the outside of the container, as is known from documents EP-A-0143183 and EP-A-60251863, permitting of satisfactory keeping of the product contained. To obtain satisfactory dispensing of the liquid or cream contained in the dispenser, the inlet nozzle of the pump 34 is provided with a plunger tube 36 which drops as far as the bottom 29 of the casing 21, the initial filling of the product contained being limited to 70% of the interior volume.

Indeed, tests have shown that with fillings of 80% or more, pumps with no air return, as used, do not function in a satisfactory manner and that with fillings of 70% the operation was always satisfactory. These tests make it possible to conclude that a maximum filling of 75% should be respected in the range of applications of the present invention (capacities typically less than 1 liter) in order to obtain dispensing without incident, preferred filling levels being between 60 and 75%.

EXAMPLE 6b

Another dispenser body identical to the body 19 in the second example is used to obtain an aerosol product dispenser according to the following modification (FIG. 7): the pump 34 is replaced by an aerosol valve fixed on the convex end 22 of the dome 20 by a shrink fixing of its fixing dome which is similar to the dome 33 of the pump. The dispenser body 19 may therefore enjoy two types of use.

EXAMPLES 7 to 9

In series production, there are various methods of establishing a sealing-tight fitment of a plastics dome such as 20 on a multi-layer casing. They are commented on in connection with FIGS. 8 to 10.

Figure 8:
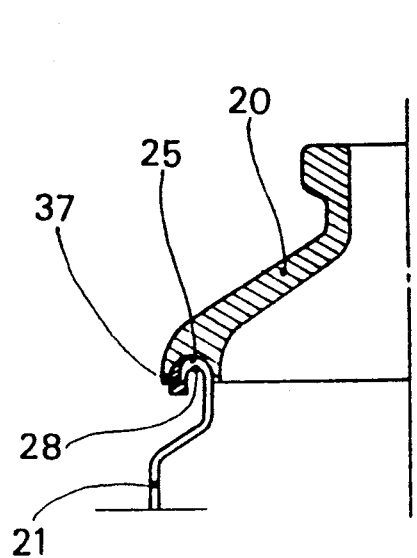
FIGS. 8 to 10 show different methods of sealing-tight assembly of the can and dome of the dispenser body, in a partial-cross-section.

FIG. 8 shows the fixing of a dome 20 having the same geometry as in the first three examples, onto a casing 21 which is identical to the casing in FIG. 6, using an annular connecting member 37 compatible with both the plastics material of the dome 2—in this case HDPE—and that of the casing 21, and also compatible with the Al which may be locally bared on the rolled edge 28 of the casing. This member 37 which has a thickness of 0.2 mm is of a complex containing the same polyolefin as that of the dome 20, that is to say PE and EAA; its outer edge snaps onto the end of the rolled edge 28 and after positioning of the dome 20 its circular groove 25 can be fitted onto the connecting member 37 and welding can be carried out by one of the following methods: by high frequency induction, by rotation or even by ultrasonics, modifying the shape of the dome so that it can support the ultrasonic transducer.

Figure 9:
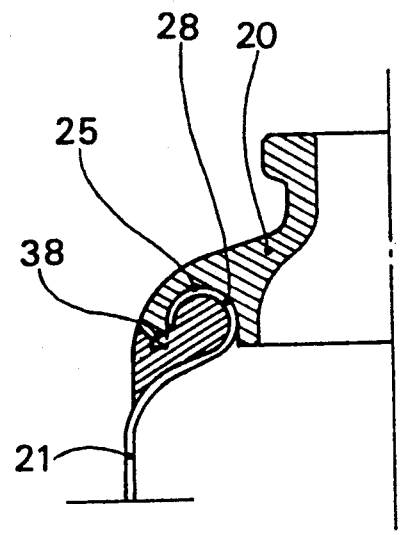

FIG. 9 shows that the dome 20 which has its circular groove 25 positioned on the rolled edge 28 of the casing 21, has one end of the circular groove 25 extending about 1 mm beyond the end of the rolled edge 28 without obstructing the interior of this rolled edge 28. By an annular injection of a plastics material of the same type as that of the dome, in this case PE, the interior cavity of the rolled edge 28 is at least partially filled by partially melting the outer skirt 38 of the dome 20 bordering the end of the circular groove 25, this skirt 25 being 1 mm thick at this location. A good quality sealing-tight welded joint is obtained which extends the skirt 38. Generally, the end 38 of the dome 20 which is thus made rigid by moulding must come into the vicinity of the end of the rolled edge, in other words less than 0.5 mm in front of this end or a little farther, leaving at least 1 mm clear passage towards the interior of the rolled edge 28.

Figure 10:
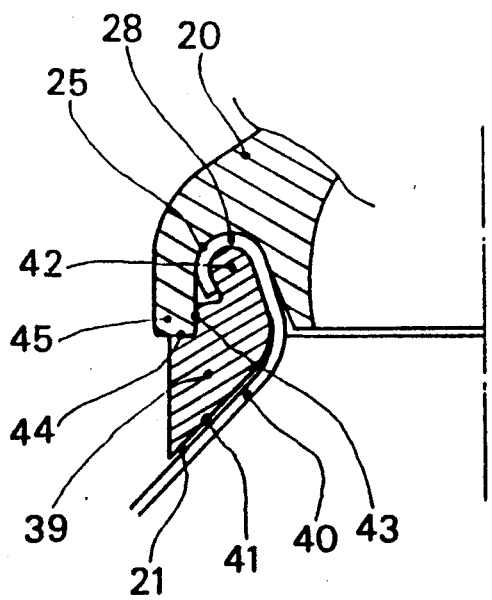
Figure 11:
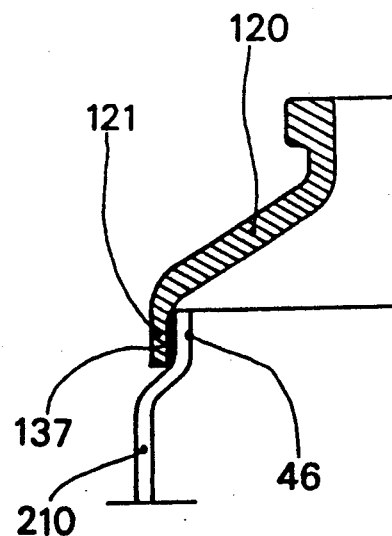
FIG. 11 shows the sealing-tight assembly of a can and a dome in partial-cross-section.

The fixing method according to FIG. 10 makes use of an annular shaped member 39 of a plastics material which is of the same type as that of the dome 20, the top of which is not shown, this member 39 being positioned on the narrowed shoulder or portion 40 of the casing prior to the rolling of its end edge. This member 39, here of PE like the dome 20, comprises a base 41 which bears on this shoulder 40 of the casing 21, an upper portion 42 which will be shrunk as shown by the rolling 28 of the top end edge of the casing 21, as well as one or more surfaces, here the two surfaces, the vertical 43 and horizontal 44, coming in contact with the outer skirt 45 of the dome 20. The shaped member 39, the rolled edge 28 and the dome 20 having been placed in position, the sealing-tight fixing is carried out by rotation welding of the annular surfaces 43 and 44 against the annular portion 45 of the dome 20. The fixing may also be carried out by HF induction welding or by ultrasonic welding.

EXAMPLE 10 (FIG. 11)

In this example, the casing 210 has been obtained in the same way as the casings 21 with the multi-layer strip and with the drawing and ironing procedure according to Example 4 but its top end 46 is in this case cylindrically narrowed to 40 mm outside diameter.

At its bottom end, the dome 120 of plastics material has a straight skirt 121 the inner surface of which fits with a clearance of 0.2 mm on the outside diameter 46, a sealing-tight fixing then being carried out by gluing.

It is also possible to use between the straight skirt 121 and the narrowed end 45 a connecting ring 137 of the same type as the connecting ring 37 in Example 7 (FIG. 8), placed around the end 137 prior to the fitment of the skirt 121 on the dome 120. Welding is then carried out by HF induction or by rotation. The inside diameter of the skirt 121 of the dome 120 and the thickness of the ring 137 are chosen in such a way as to achieve a slight clamping effect prior to welding.

APPLICATIONS

The multi-layer strip according to the invention and the various hollow bodies, containers or dispensers which employ it are used in varied fields such as those of cleaning products, hygiene, food, cosmetics and pharmaceuticals, the majority of these products being inert vis-a-vis its interior coating of plastic material.

What is claimed is:

1. A strip for producing a hollow body by deep drawing or drawing and ironing, said strip comprising:
    an aluminum alloy base having two surfaces, each said surface having coated thereon an anodic or chemical conversion oxide layer having a thickness of 20 to 80 nm;
    one said surface carrying, over said oxide layer, a coating of plastic material; and
    the opposite surface carrying, over said oxide layer, a layer of cured in-situ varnish having distributed therein a plurality of micronized, solid lubricant particles insoluble in the varnish and harder than the cured varnish, the mean diameter of said particles being greater than the thickness of the cured varnish, resulting in protuberance of said particles over said opposite surface.

2. A strip according to claim 1 in which said base of aluminum alloy comprises on each surface a layer of anodic oxide of a thickness between 30 and 80 nm.

3. A strip according to claim 2 in which the anodic oxide layer is obtained by phosphoric anodization.

4. A strip according to claim 1 in which said base of aluminum alloy comprises on each surface a chemical conversion coating of a thickness between 20 nm and 60 nm.

5. A strip according to any one of claims 1 to 4 in which the average diameter of the particles (100) of solid lubricant is between 1 and 30 $\mu$m.

6. A strip according to claim 5, in which the cured varnish layer contains between 0.1 and 10% by weight of solid lubricant.

7. A strip according to claim 6, in which said varnish layer contains between 0.5 and 5% solid lubricant.

8. A strip according to claim 5, in which the solid lubricant consists essentially of particles (100) selected from the group consisting of polyethylene with a molecular weight in excess of 100,000, polypropylene, polytetrafluoroethylene, organic amide and mixtures thereof.

9. A strip according to claim 2 in which said coating of plastic material is a layer of a thickness between 15 $\mu$m and 100 $\mu$m and has an elongation rate of more than 200% in all directions.

10. A strip according to claim 9 in which said coating of plastic material (7, 11) comprises at least one coat containing, by weight, at least 50% and up to 100% of polyethylene, polypropylene or copolymer of polyethylene or polypropylene with another polyolefin, and at most 50% of an acid copolymer obtained from olefins and unsaturated organic acids or anhydrides, and optionally unsaturated esters.

11. A strip according to claim 10, in which said coating of plastic material comprises a plurality of layers of different compositions, consisting of polyethylene with a molecular weight in excess of 100,000, polypropylene, polytetrafluoroethylene, organic amide and mixtures thereof.

12. A strip according to claim 9 in which said layer of plastic material comprises linear low-density polyethylene.

13. A strip according to any one of claims 9 to 11 comprising between said base (5) and the said layer of plastic material (11) an adhesive layer (9) which comprises polyurethane and which is between 0.5 and 10 μm thick.

14. A strip according to any one of claims 9 to 11, comprising between said base (5) and said plastic layer (7) an adhesive layer (10) of a thickness between 1 μm and 20 μm and comprising more than 50% and up to 100% by weight of acid copolymer and less than 50% by weight of polyolefins.

15. A strip according to claim 9, in which said layer of plastic material contains, by weight, from 0.1 to 0.5% ethylene bistearamide.

16. A strip according to claim 1 in which said layer of varnish (6) has a thickness between 1 and 8 μm.

17. A strip according to claim 16 in which said varnish is a varnish selected from the group consisting of acrylic, epoxy urea, vinyl organisol, epoxy phenol, and polyester varnishes.

18. A strip according to claim 16, in which said thickness is between 2 and 5 μm.

19. A strip according to claim 1, wherein the ratio of the mean diameter of said particles to the thickness of said cured varnish is less than about 10.

20. A strip according to claim 19 in which the ratio of the mean diameter of said particles to the thickness of said cured varnish is between 4 and 10.

* * * * *